T. V. MALONE.
PLATFORM SCALE.
APPLICATION FILED JULY 6, 1908.

923,285.

Patented June 1, 1909.
2 SHEETS—SHEET 1.

Witnesses:
Alex Sagaard
H. A. Bowman

Inventor:
Thomas V. Malone
By P. H. Gunckel
his Attorney

T. V. MALONE.
PLATFORM SCALE.
APPLICATION FILED JULY 6, 1908.

923,285.

Patented June 1, 1909.
2 SHEETS—SHEET 2.

Witnesses:
Alex Lagaard
H. Q. Bowman

Inventor:
Thomas V. Malone
By P. N. Gunckel
his Attorney

UNITED STATES PATENT OFFICE.

THOMAS V. MALONE, OF MINNEAPOLIS, MINNESOTA.

PLATFORM-SCALE.

No. 923,285.

Specification of Letters Patent.

Patented June 1, 1909.

Application filed July 6, 1908. Serial No. 442,080.

*To all whom it may concern:*

Be it known that I, THOMAS V. MALONE, a citizen of the United States, residing at Minneapolis, in the county of Hennepin and State of Minnesota, have invented certain new and useful Improvements in Platform-Scales, of which the following is a specification.

My invention relates to platform scales, and its object is to provide an attachment to such scales that will make them more efficient for the weighing of flour and like material in sacks the mouths of which are open at the time of the weighing.

In milling flour and some other products it is common to fill the sacks by means of a packing machine and then to pass the sacks in succession to the weighing-scales before the mouths of the sacks are closed, so that the contents of a sack can be readily increased or diminished as may be required to make the successive packages of uniform and the desired weight. In conducting this operation more or less of the material falls onto the platform of the scales as each successive sack is received and removed, and the material accumulating on the platform affects the accuracy of the weighing, and frequent removal of such material is required to make the contents of the packages of uniform weight.

The purpose of, and the end effected by, my improvement is the provision of a supplemental platform supported by the weighing mechanism and adapted to hold the sack while it is being weighed, and the interposition between the two platforms of a suitable shield for preventing material from falling onto the lower platform.

My improvements are illustrated in the accompanying drawings, in which—

Figure 1:
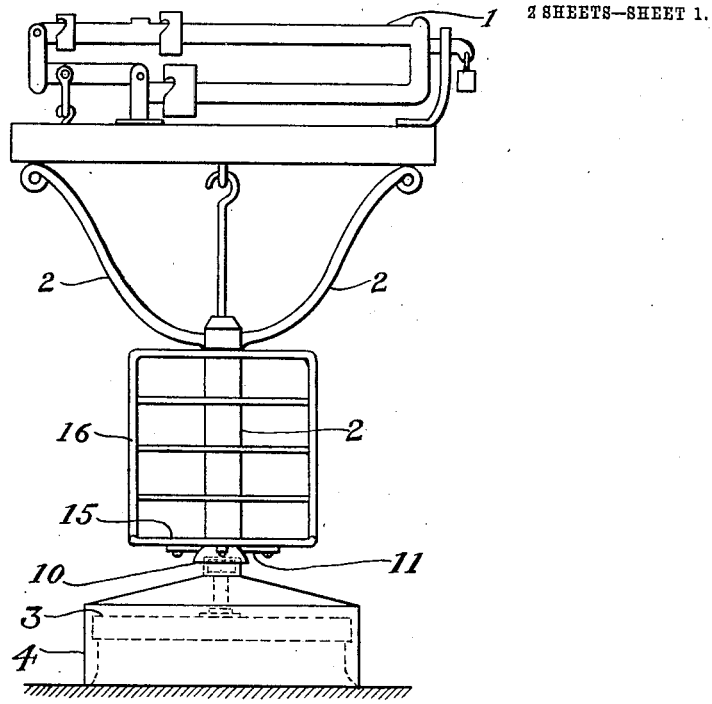
Figure 2:
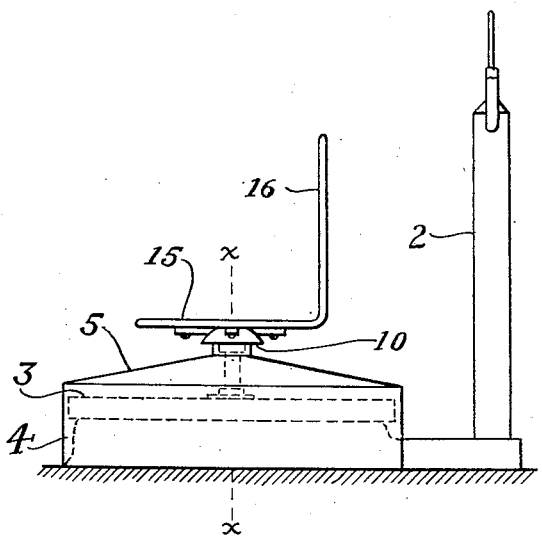
Figure 3:
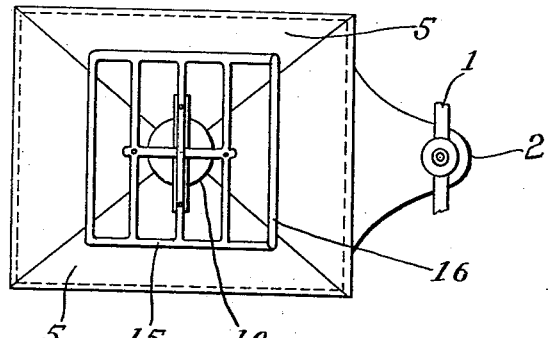
Figure 4:
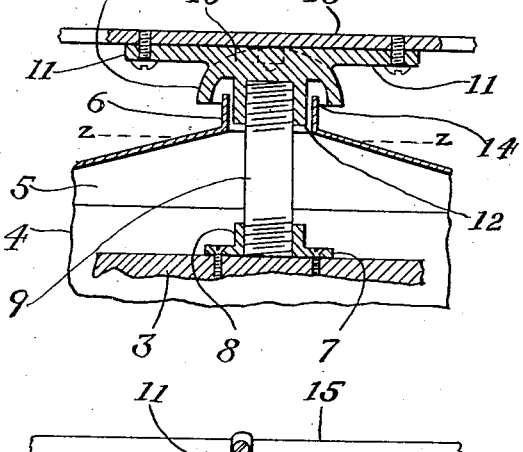
Figure 5:
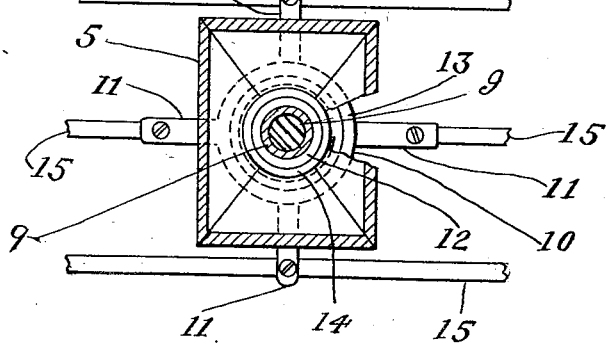

Figure 1 is a front elevation of a platform scale embodying my improvement; Fig. 2 is a side elevation, and Fig. 3 a plan view of the same; Fig. 4 is a transverse section, enlarged, on the line *x*—*x* of Fig. 2; and Fig. 5 is a horizontal section on the plane of the line *z*—*z* of Fig. 4.

In the drawings 1 designates the scale-beam, 2 the supports therefor, and 3 the platform of an ordinary platform-scale. I claim no invention in these parts and the scale may be of any well known or suitable kind.

To prevent flour or other material from accumulating on the platform or within the base, I preferably cover the entire base and platform with a hood or housing composed of sides 4 and a top 5, preferably inclined downwardly from the center. This housing may rest on the floor free from contact with the scale. The center of the top of the housing is open and the opening is surrounded by a circular flange 6 extending upward from the housing cover.

At the center of the platform is attached a plate 7 providing a socket 8, and in the socket is screwed, or otherwise secured, a short upright post 9 which extends through the central opening in the housing cover. On the head of the post is screwed, or otherwise secured, a hub 10 from which extend radial arms 11. The hub is provided with two downwardly extending circular flanges, 12 and 13, respectively, providing an intermediate annular space 14. The inner or socket flange 12 furnishes the means for adjustable attachment to the post 9; and the two flanges coöperate with the housing flange 6, which extends within the annular space 14, to make a comparatively tight joint between the fixed and movable parts.

To the arms 11 is secured a light, preferably an open-work, weighing-platform 15, that may be provided with an upright portion 16 at one side, against which the sacks of material may be leaned for support.

It will be apparent that the supplemental weighing-platform and its connections are supported by the main platform free from contact with stationary parts, and that in weighing articles it is only necessary to deduct the weight of the added parts.

Applicant has for some time had such weighing apparatus in use for the weighing of filled but open sacks in large flour mills where such sacks are weighed and handled in great numbers, and where rapidity and accuracy are necessary, and their use has shown a very decided improvement over the former methods of weighing.

Having described my invention, what I claim and desire to secure by Letters Patent is—

In a platform scale, the combination with the main platform and a housing therefor, of a cover for the platform supported by the housing, a post secured on the platform and extending loosely through the cover, and an open-work weighing platform mounted on the post above the cover and provided with a back, substantially as and for the purpose set forth.

In testimony whereof I have signed my name to this specification in the presence of two subscribing witnesses this 30th day of June 1908.

THOMAS V. MALONE.

Witnesses:
 P. H. GUNCKEL,
 H. A. BOWMAN.